US011184269B1

(12) United States Patent
Nee et al.

(10) Patent No.: US 11,184,269 B1
(45) Date of Patent: Nov. 23, 2021

(54) COLLECTING ROUTE-BASED TRAFFIC METRICS IN A SERVICE-ORIENTED SYSTEM

(71) Applicant: Amazon Technologies, Inc., Seattle, WA (US)

(72) Inventors: Darin Silva Nee, Mill Valley, CA (US); Brian Thomas Smith, Cupertino, CA (US); Sergei Rutenberg, San Carlos, CA (US); Anton Vladilenovich Goldberg, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/846,631

(22) Filed: Apr. 13, 2020

(51) Int. Cl.
  *H04L 12/26* (2006.01)
(52) U.S. Cl.
  CPC .............................. *H04L 43/0888* (2013.01)
(58) Field of Classification Search
  CPC .................................................. H04L 43/0888
  See application file for complete search history.

(56) References Cited

U.S. PATENT DOCUMENTS

| | | | |
|---|---|---|---|
| 5,809,121 A | 9/1998 | Elliott et al. | |
| 5,930,344 A | 7/1999 | Relyea et al. | |
| 6,877,035 B2 | 4/2005 | Shahabuddin et al. | |
| 7,023,979 B1 | 4/2006 | Wu et al. | |
| 7,054,943 B1 | 5/2006 | Goldszmidt et al. | |
| 7,209,548 B2 | 4/2007 | Ethier et al. | |
| 7,372,952 B1 | 5/2008 | Wu et al. | |
| 7,388,839 B2 | 6/2008 | Chafle et al. | |
| 7,496,799 B2 | 2/2009 | Prang et al. | |
| 7,594,006 B2 | 9/2009 | Rolia et al. | |
| 7,676,034 B1 | 3/2010 | Wu et al. | |

(Continued)

FOREIGN PATENT DOCUMENTS

| | | |
|---|---|---|
| EP | 1372073 | 12/2003 |
| WO | 2013147660 | 10/2013 |

OTHER PUBLICATIONS

U.S. Appl. No. 14/491,438, filed Sep. 19, 2014, Harsha Ramalingam et al.

(Continued)

*Primary Examiner* — Jerry B Dennison
(74) *Attorney, Agent, or Firm* — Robert C. Kowert; Kowert, Hood, Munyon, Rankin & Goetzel, P.C.

(57) ABSTRACT

Methods, systems, and computer-readable media for collecting route-based traffic metrics in a service-oriented system are disclosed. A first service in a service-oriented system receives an inbound request from a second service. From the inbound request, the first service extracts, a route identifier representing an upstream route including the second service. The first service stores the route identifier and a counter representing a number of inbound requests with the route identifier that have been received by the first service over a current window of time. The first service sends, to a traffic metric collection system, a metric message comprising the route identifier and the counter. Traffic metric data is determined by the traffic metric collection system using the metric message from the first service and one or more additional metric messages from one or more additional services. The traffic metric data indicates one or more flows of requests through the services.

20 Claims, 9 Drawing Sheets

(56) References Cited

U.S. PATENT DOCUMENTS

| | | | |
|---|---|---|---|
| 7,707,015 B2 | 4/2010 | Lubrecht et al. | |
| 8,140,371 B2 | 3/2012 | Franz et al. | |
| 8,204,981 B1 | 6/2012 | Mishra | |
| 8,219,368 B1 | 7/2012 | Akella et al. | |
| 8,260,649 B2 | 9/2012 | Ramanujan et al. | |
| 8,300,798 B1 | 10/2012 | Wu et al. | |
| 8,396,204 B2 | 3/2013 | Guerrero et al. | |
| 8,612,180 B2 | 12/2013 | Yan et al. | |
| 8,654,629 B1 | 2/2014 | Craig et al. | |
| 8,909,567 B2 | 12/2014 | Kang et al. | |
| 9,430,354 B2 | 8/2016 | Renkema | |
| 9,450,849 B1 | 9/2016 | Goldberg et al. | |
| 9,559,928 B1 | 1/2017 | Porter et al. | |
| 9,626,275 B1 | 4/2017 | Hitchcock et al. | |
| 9,634,920 B1 | 4/2017 | Goldberg et al. | |
| 9,928,517 B1 | 3/2018 | Hitchcock et al. | |
| 10,374,915 B1 | 8/2019 | Zhi et al. | |
| 10,445,253 B2 | 10/2019 | Alatorre et al. | |
| 10,454,795 B1 | 10/2019 | Jonsson et al. | |
| 10,554,701 B1 | 2/2020 | Decker et al. | |
| 10,567,467 B2 | 2/2020 | Sreevalsan et al. | |
| 10,581,964 B2* | 3/2020 | Einkauf | H04L 67/10 |
| 2001/0021176 A1* | 9/2001 | Mimura | H04L 1/20 370/235 |
| 2003/0093527 A1 | 5/2003 | Rolia | |
| 2003/0154112 A1 | 8/2003 | Neiman et al. | |
| 2004/0138936 A1 | 7/2004 | Johnson et al. | |
| 2004/0226015 A1 | 11/2004 | Leonard et al. | |
| 2005/0005012 A1 | 1/2005 | Odhner et al. | |
| 2005/0138111 A1 | 6/2005 | Aton et al. | |
| 2005/0276388 A1 | 12/2005 | Ethier et al. | |
| 2006/0090163 A1 | 4/2006 | Karisson et al. | |
| 2008/0172275 A1 | 7/2008 | Ramanujan et al. | |
| 2008/0271038 A1 | 10/2008 | Rolia et al. | |
| 2008/0271039 A1 | 10/2008 | Rolia et al. | |
| 2009/0290700 A1 | 11/2009 | Omiya | |
| 2010/0088205 A1 | 4/2010 | Robertson | |
| 2010/0088663 A1 | 4/2010 | Hammer et al. | |
| 2011/0255675 A1 | 10/2011 | Jasper et al. | |
| 2012/0087486 A1 | 4/2012 | Guerrero et al. | |
| 2012/0102170 A1* | 4/2012 | Hiltunen | H04L 41/50 709/223 |
| 2012/0144008 A1 | 6/2012 | Yuyitung et al. | |
| 2012/0324092 A1 | 12/2012 | Brown et al. | |
| 2012/0330711 A1 | 12/2012 | Jain et al. | |
| 2013/0156557 A1 | 6/2013 | Green et al. | |
| 2014/0046639 A1 | 2/2014 | Ricketts | |
| 2014/0181267 A1 | 6/2014 | Wadkins et al. | |
| 2016/0099853 A1* | 4/2016 | Nedeltchev | H04L 43/0888 370/253 |
| 2016/0182328 A1* | 6/2016 | Bhasin | H04L 43/067 709/224 |
| 2017/0257444 A1* | 9/2017 | Wood | H04L 69/02 |
| 2020/0175439 A1* | 6/2020 | Abu El Ata | G06N 7/005 |
| 2020/0287962 A1* | 9/2020 | Mishra | H04L 67/1008 |

OTHER PUBLICATIONS

Rodrigo Fonseca, et al., "X-Trace: A Pervasive Network Tracing Framework", 4th USENIX Symposium of Networked Systems Design & Implementation (NSDI'07), Apr. 2007, pp. 1-14.

Behamin H. Sigelman, et al., "Dapper a Large-Scale Distributed Systems Tracing Infrastructure", Google Technical Report dapper-2010-1, Apr. 2010, pp. 1-14.

U.S. Appl. No. 14/491,762, filed Sep. 19, 2014, Ayan Roy Sarkar.

Jogalekar, et al., "Evaluating the scalability of distributed systems", IEEE Transactions on parallel and distributed systems 11.6, 2000, pp. 589-603.

Appleby, et al., "Using automatically derived load thresholds to manage compute resources on-demand", Integrated Network Management, 2005, IM 2005, 2005 9th IFIP/IEEE International Symposium, pp. 747-760.

U.S. Appl. No. 16/140,424, filed Sep. 24, 2018, Darin Nee, et al.

* cited by examiner

COLLECTING ROUTE-BASED TRAFFIC METRICS IN A SERVICE-ORIENTED SYSTEM

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Web servers backed by distributed systems may provide stores that offer goods and/or services to consumers. For instance, consumers may visit a merchant's web site to view and purchase goods and services offered for sale by a set of vendors. Some web-accessible stores include large electronic catalogues of items offered for sale. For each item, such electronic catalogues typically include at least one product detail page that specifies various information about the item, such as a description of the item, one or more pictures of the item, as well as specifications (e.g., weight, dimensions, capabilities) of the item. In various cases, such stores may rely on a service-oriented architecture to implement various business processes and other tasks. The service-oriented architecture may be implemented using a distributed system that includes many different computing resources and many different services that interact with one another, e.g., to produce a product detail page for consumption by a client of a web server.

Figure 1:
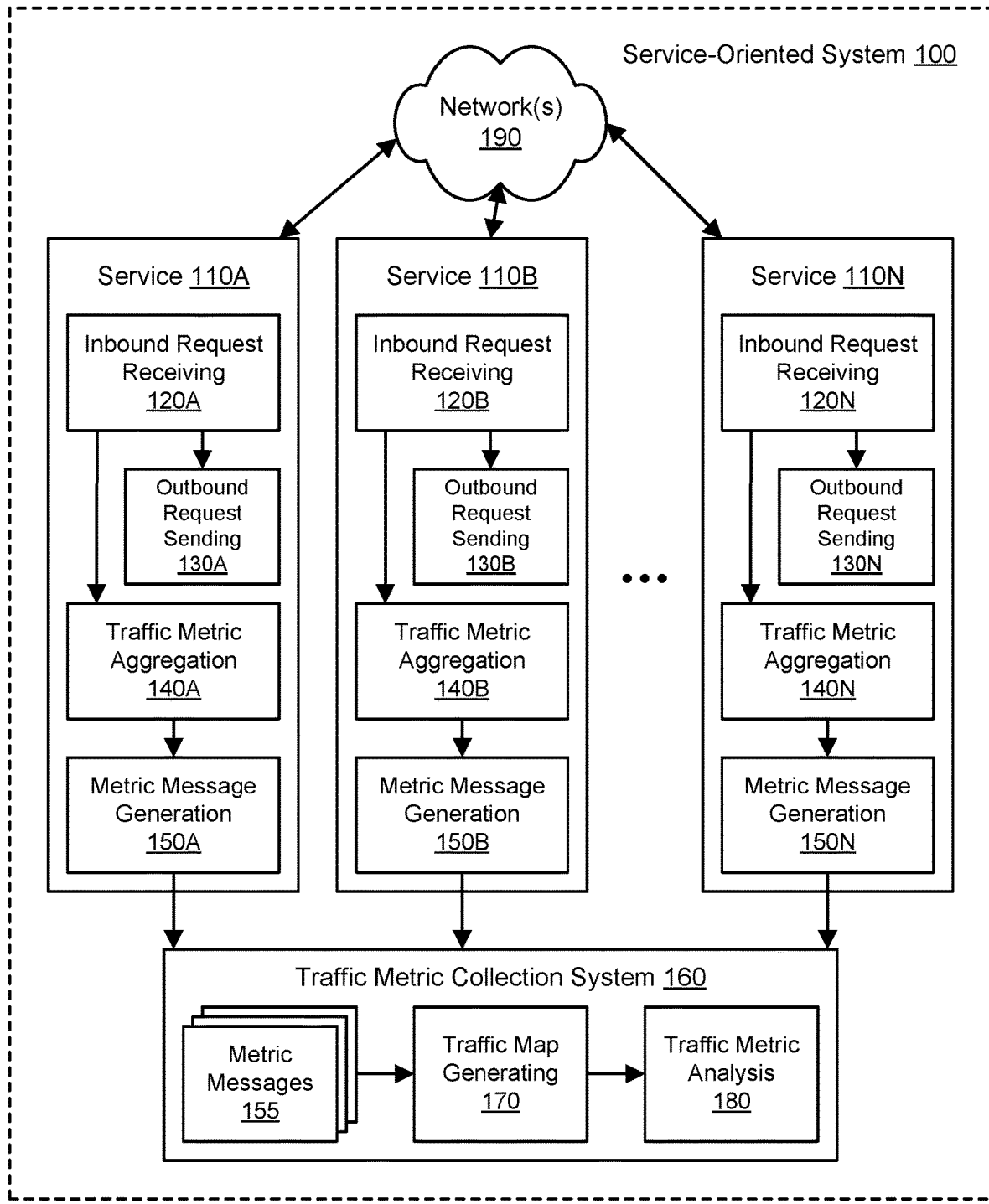
FIG. 1 illustrates an example system environment for collecting route-based traffic metrics in a service-oriented system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for collecting route-based traffic metrics in a service-oriented system are described. In one embodiment, a service-oriented system includes a set of services that interact via service requests to collaborate and perform tasks. Service owners and other system administrators may seek to determine dependency relationships among services along with traffic metrics such as call volume, latency, error rate or success rate, and so on. Using prior approaches, individual requests were traced from one service to another by passing a trace identifier from service to service through the call path. However, due to the overhead associated with such tracing techniques, oftentimes only some requests could be traced, e.g., by sampling a percentage of root requests. When sampling was used in this manner, some infrequently used call paths could escape detection. If the use of a call path is unknown to system administrators, they may be unable to detect traffic anomalies in the call path, to properly allocate resources based on anticipated traffic, or to perform other forms of analysis.

In one embodiment, traffic metrics may be collected such that all (or nearly all) service interactions may be reflected in traffic metrics without using sampling. Instead of collecting traffic metrics specific to particular requests, individual services may aggregate traffic metrics (e.g., call volume, latency, error rate or success rate, and so on) for particular upstream call paths. For example, a first service may keep track of the number of inbound requests originating from a particular upstream route including one or more upstream services. Route identifiers for upstream routes may be represented by fixed-length hash values. If the first service sends an outbound request to a downstream service, the first service may add to the request an outbound hash key generated based (at least in part) on its service (or API) identifier along with the inbound hash key. The traffic metrics at a service may be aggregated for a current window of time (e.g., one minute). After the window of time has closed, the service may generate a metric message that indicates aggregate traffic metrics associated with particular upstream route identifiers for the window of time. A traffic metric collection system may receive metric messages for the window of time from many service hosts. The traffic metric collection system may generate one or more traffic maps that indicate observed call paths (e.g., as dependency graphs) as well as traffic metrics such as call volume, latency, error rate or success rate, and so on. By capturing metrics for all (or nearly all) service interactions without using sampling techniques, the traffic metric collection system may permit more accurate analysis of the service-oriented system.

As one skilled in the art will appreciate in light of this disclosure, embodiments may be capable of achieving certain technical advantages, including some or all of the following: (1) improving the accuracy of traffic metrics in a set of services that implement a service-oriented architecture by using unsampled data; (2) improving the use of network bandwidth by aggregating traffic metrics at individual services for a window of time and sending metric messages that represent aggregated data; (3) improving the use of network bandwidth by representing upstream routes in requests using fixed-length hash keys; (4) improving the performance and security of the set of services by using the unsampled traffic metrics to perform traffic anomaly detection; (5) improving the accuracy of resource usage analysis by using the unsampled traffic metrics to assign accurate resource usage values for downstream services to root requests; (6) improving resource allocation and scaling for the set of services by accurately forecasting demand using the unsampled traffic metrics; (7) improving latency analysis by using accurate collection of traffic metrics with unsampled data to determine bottlenecks in a distributed system; and so on.

FIG. 1 illustrates an example system environment for collecting route-based traffic metrics in a service-oriented system, according to some embodiments. The example system environment may include a service-oriented system 100 with a plurality of services 110A-110N and a traffic metric collection system 160. The service-oriented system 100 may implement a service-oriented architecture and may include multiple services 110A-110N configured to communicate with each other (e.g., through message passing) to carry out various tasks. Although three services 110A, 110B, and 110N are illustrated for purposes of example, it is contemplated that any suitable number and configuration of services may be used with the service-oriented system 100. One of services 110A-110N may represent an individual service host or a set of service hosts that implement the same service. The services 110A-110N may be implemented using a plurality of hosts, any of which may be implemented by the example computing device 3000 illustrated in FIG. 8. The hosts may be located in any suitable number of data centers or geographical locations. In one embodiment, multiple services and/or instances of the same service may be implemented using the same host. It is contemplated that the service-oriented system 100 and/or and traffic metric collection system 160 may include additional components not shown, fewer components than shown, or different combinations, configurations, or quantities of the components shown.

Each service 110A-110N may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. In some embodiments, services may be loosely coupled in order to minimize (or in some cases eliminate) interdependencies among services. This modularity may enable services to be reused in order to build various applications through a process referred to as orchestration. A service may include one or more components that may also participate in the service-oriented system, e.g., by passing messages to other services or to other components within the same service. A service may offer one or more application programming interfaces (APIs) or other programmatic interfaces through which another service may request the functionality of the service. In one embodiment, the traffic metric collection system 160 may collect traffic metrics and generate traffic maps at the granularity of individual APIs of a service.

The service-oriented system 100 may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of processes.

The services 110A-110N described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

Figure 2:
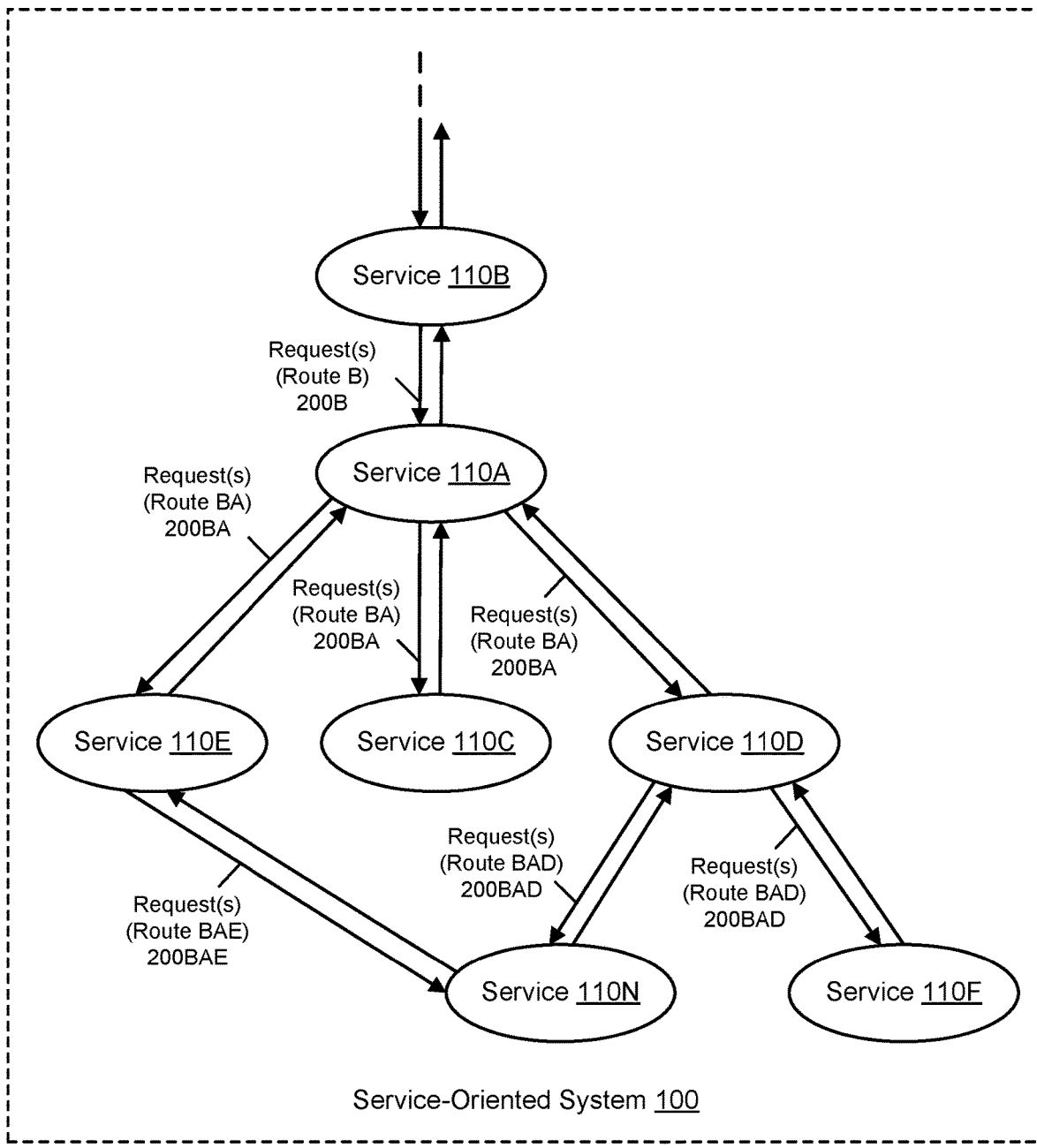
FIG. 2 illustrates further aspects of the example system environment for collecting route-based traffic metrics in a service-oriented system, including an example of a dependency graph for a set of services, according to some embodiments.

Services may collaborate to perform tasks by sending requests to other services, e.g., via one or more networks 190. As shown in the example of FIG. 1, service 110A may include a component 120A for receiving inbound requests and a component 130A for sending outbound requests, service 110B may include a component 120B for receiving inbound requests and a component 130B for sending outbound requests, and service 110N may include a component 120N for receiving inbound requests and a component 130N for sending outbound requests. An example of call paths using such requests is shown in FIG. 2. To monitor service requests and responses, lightweight instrumentation and/or agent software may be added to services, including services 110A-110N. The instrumentation (e.g., a reporting agent associated with each service) may collect and report aggregate traffic metrics to a backend system or service such as the traffic metric collection system 160. As shown in FIG. 1, service 110A may include a component 140A for traffic metric aggregation, service 110B may include a component 140B for traffic metric aggregation, and service 110N may include a component 140N for traffic metric aggregation.

Traffic metrics may be aggregated efficiently in memory at service hosts. The amount of memory may be reduced by publishing the aggregated metrics and re-initializing the metric values periodically, e.g., every minute. The aggregate traffic metrics at a given service may be collected and reported periodically, e.g., each minute. The aggregate traffic metrics at a given service may be collected for particular upstream routes. In some embodiments, aggregate metrics may be associated with particular upstream routes for a given window of time (e.g., one-minute intervals). In some embodiments, aggregate traffic metrics may be collected for call volume (e.g., the total number of calls to a service or API), network latency or response latency, error rate or success rate of requests, network throughput, service reliability or availability, usage metrics at service hosts (e.g., processor usage, memory usage, and so on). In some embodiments, aggregate traffic metric values may include a request count, error count, response count, latency minimum, latency maximum, latency sum, and/or an exponential histogram of latency values having a 10% scaling factor. Aggregation of a traffic metric may include initializing a value to zero at the beginning of a time interval and incrementing that value for every relevant event during the time interval, e.g., incrementing a counter for requests from a particular upstream route. Aggregation of a traffic metric may include maintaining an average value, e.g., for response latency over the current time interval. Aggregation of a traffic metric may include generating a ratio corresponding to the time interval, e.g., to calculate a rate of successfully processed requests to all requests or a rate of error-generating requests to all requests over the current time interval. Sampling may not be used, and so aggregate traffic metrics may reflect all (or nearly all) requests to services for which traffic metric collection has not been disabled. In one embodiment, once services are onboarded to the traffic metric collection system 160, traffic metric aggregation for those services may be enabled by default because the overhead may be relatively low (e.g., in comparison to tracing of individual requests).

In some embodiments, services 110A-110N may generate and send metric messages 155 to the traffic metric collection system 160. As shown in FIG. 1, service 110A may include a component 150A for sending metric messages, service 110B may include a component 150B for sending metric messages, and service 110N may include a component 150N for sending metric messages. In one embodiment, each service may send a metric message approximately once every time interval for which traffic metrics are aggregated. For example, if metrics are aggregated for one-minute intervals, then each of services 110A-110N may send one metric message approximately once per minute. A given service may send the metric message for a time interval after the corresponding window of time (e.g., the previous minute) has closed. To reduce network congestion, each service may delay sending the metric message for a randomly determined additional time (e.g., zero seconds to fifty seconds for one-minute intervals of metric aggregation). The metric message for a given service may include aggregate traffic metrics for any upstream routes that were represented in inbound requests at that service for the corresponding time interval.

A metric message may include a header. The header may include a version number describing the metrics in the message, the timestamp of the interval (e.g., a particular minute) associated with the metrics, the resource ID associated with the sending host, the region associated with the sending host, the stage (e.g., alpha, beta, gamma, production) associated with the sending host, and the hostname of the host. The metric message may include a list of observed service APIs for the time interval, with each represented by a service API identity hash and the corresponding tenant and operation name. The metric message may include a route metrics object. The route metrics object may include a dictionary with string keys and four-byte integer array values. The keys may include descriptors for each observed route. A route descriptor may be formatted as <inbound route ID><service API identity hash>, and the integer arrays may include metric values for the time interval for that route. Some metrics may use multiple indices. For example, an eight-byte latency sum metric may use two array indices. Compact support for latency values from 1 ms to 1 year may be provided by combining a one-byte bucket number and a three-byte count.

The traffic metric collection system 160 may receive metric messages 155 for the window of time from many service hosts, e.g., via the network(s) 190. Using a component 170 for generating traffic maps, the traffic metric collection system 160 may use the metric messages 155 as input for generating one or more traffic maps indicative of call paths and/or traffic metrics in the service-oriented system 100. The traffic map(s) may indicate observed call paths, e.g., using dependency graphs that show a flow of requests and responses from service to service. The traffic map(s) may indicate traffic metrics such as call volume, latency, error rate or success rate, and so on for individual service hosts, fleets of service hosts for particular services, and/or sets of services.

Using the metric messages 155, the traffic metric collection system 160 may generate one or more call graphs or service dependency graphs. Each call graph may represent the flow of requests from service (or API) to service (or API) and may identify service dependencies. Each call graph may include a plurality of nodes representing services or APIs and one or more edges (also referred to as call paths) representing service interactions. Each call graph may include a hierarchical data structure that includes nodes representing the services and edges representing the interactions. In some cases, a call graph may be a deep and broad tree with multiple branches each representing a series of related service calls.

In some embodiments, the traffic metric collection system 160 may use the metric messages 155 and/or traffic maps to perform additional traffic metric analysis 180. For example, the traffic metric collection system 160 may use the aggregate traffic metrics to assign resource usage values or costs for downstream service usage to root requests. As another example, the traffic metric collection system 160 may use the aggregate traffic metrics to predict demand in order to enable auto-scaling of computing resources used to implement services. As yet another example, the traffic metric collection system 160 may use the aggregate traffic metrics to detect traffic anomalies in call paths, including infrequently used call paths that might not be detected using sampling of requests. By capturing metrics for all (or nearly all) service interactions without using sampling techniques, the traffic metric collection system may permit more accurate analysis of the service-oriented system.

In one embodiment, the traffic metric collection system 160 may determine one or more performance metrics based on the metric messages 155. In one embodiment, the performance metrics may describe aspects of the performance of multiple service interactions, such as metrics representing aggregate performance, average performances, etc. For example, the metric messages 155 may indicate average or aggregate client-measured latencies for interactions, e.g., based on the time at which a request was sent by a service and also on the time at which a response to the request was received by the service. The metric messages 155 may indicate the average or aggregate server-measured latencies for an interaction based on the time at which a request was received by a service and also on the time at which a response to the request was sent by the service. The network transit time for the interaction may be calculated as the difference between the client-measured latency and the server-measured latency. Accordingly, the performance metrics may include average or aggregate transit time metrics (e.g., mean, median, etc.) for multiple service calls. Network transit times may be impacted by the number of network hops, the physical distance between hops, and the link quality between endpoints. In one embodiment, the performance metrics may describe aspects of the costs of performing or maintaining various interactions, services, instances of services, and/or hosts. For example, the cost may include elements of computing resource usage (e.g., processor usage, persistent storage usage, memory usage, etc.), energy consumption, heat production, and/or any other suitable cost element(s).

In one embodiment, the analysis may be performed using automated techniques, e.g., to generate reports outlining recommendations or identifying problems for system administrators. In one embodiment, the analysis may be performed manually using a traffic map as reported to a system administrator in a user interface. In one embodiment, the analysis may include scaling analysis that analyzes a traffic map and determines whether a particular service should be scaled up or down. In one embodiment, the analysis may include root cause analysis that identifies one or more services or APIs as the root cause of a performance problem in the service-oriented system, e.g., a high latency for requested tasks, an excessive number of dropped requests or errors, and so on. In one embodiment, the analysis may include blast radius analysis that determines the impact of an outage at a particular service or API, e.g., on other services that tend to be in its call paths. In one embodiment, the analysis may include cost attribution analysis that determines a cost or resource usage value attributed to one service or API for tasks performed by another service or API.

Based (at least in part) on the scaling analysis, one or more services may be scaled manually or automatically. Scaling of a service may include increasing the number of instances (or nodes) that implement the service, decreasing the number of instances that implement the service, modifying the locations of service instances, and so on. Scaling may affect the performance of the service-oriented system 100. For example, the addition of a new service instance may reduce the number of requests handled by the existing instance and thus improve the availability of the existing instance and reduce the latency of its processing of requests. Conversely, if the scaling analysis indicates that a service is underutilized relative to its number of instances, then the number of instances may be reduced to achieve less waste in computing resources. In one embodiment, based (at least in part) on scaling analysis, the service-oriented system 100 may be optimized over time to adapt to changing conditions.

In one embodiment, at least a portion of the set of computing resources for a particular service may be automatically allocated from a pool of computing resources. The pool of computing resources may be managed by a resource manager associated with the service-oriented system 100. The pool may represent a plurality of computing resources which are available to various services in a service-oriented system 100, including the particular service. The pool may include a plurality of computing resources such as virtual compute instances that may be heterogeneous or homogeneous in their hardware capabilities and software configuration. The computing resources in the pool may be usable to provide or otherwise implement one or more services.

In one embodiment, the resource manager may manage a multi-tenant, cloud-based provider network that includes the computing resources used for scaling of services. The provider network may include numerous data centers hosting various resource pools, such as collections of physical and/or virtualized computer servers, storage devices, and networking equipment that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. In one embodiment, an operator of the provider network may implement a flexible set of resource reservation, control, and access interfaces for clients. For example, a provider network may implement a programmatic resource reservation interface (e.g., via a web site or a set of web pages) that allows clients to learn about, select, purchase access to, and/or reserve resources. Using such an interface, the scaling analysis may allocate various computing resources to services for a period of time.

The traffic metric collection system 160 may be offered as a service to clients of the provider network. For example, the clients may represent users who seek to obtain accurate, unsampled traffic metrics for their service-oriented systems. The traffic metric collection system 160 may include one or more computing devices, any of which may be implemented by the example computing device 3000 illustrated in FIG. 8. In various embodiments, the functionality of the different services, components, and/or modules of the traffic metric collection system 160 may be provided by the same computing device or by different computing devices. If any of the various components of the service-oriented system 100 and/or traffic metric collection system 160 are implemented using different computing devices, then the respective computing devices may be communicatively coupled, e.g., via a network 190.

In one embodiment, aspects of the service-oriented system 100 and/or traffic metric collection system 160 may be performed automatically and/or programmatically, e.g., by executing program instructions without direct user intervention to collect and/or analyze aggregate traffic metrics. In one embodiment, aspects of the traffic metric collection may be performed continuously and/or repeatedly to adapt to changing conditions in the service-oriented system 100. For example, a traffic map involving a particular set of services may be kept up to date based on the latest metric data, e.g., by revising the traffic map periodically. In this manner, the traffic map may be updated to capture the effects of demand changes in the service-oriented system 100. As another example, a traffic map involving a particular service may be updated when the program code for the service is updated. In one embodiment, the traffic metric collection system 160 may be used in a deployment pipeline for new software (including new versions of software) such that a traffic map is determined based on the latest version of the program code.

FIG. 2 illustrates further aspects of the example system environment for collecting route-based traffic metrics in a service-oriented system, including an example of a dependency graph for a set of services, according to some embodiments. As discussed above, services may collaborate to perform tasks by sending requests to other services, e.g., along various routes. A route may correspond to a set of call paths between services or APIs. The call paths may represent inbound service requests and outbound service requests relative to a particular service or API. To process a given received request, one or more services may be invoked. As used herein, an initial request may be referred to as the "root request." In various embodiments, the root request may but need not originate from a computer system outside of the service-oriented system 100. In many embodiments, a root request may be processed by an initial service, which may then call APIs of one or more other services. Additionally, each of those services may also call APIs of one or more other services, and so on until the root request is completely fulfilled. The particular services or APIs called to fulfill a request may be represented as a call graph that specifies, for each particular service or API of multiple services or APIs called to fulfill the same root request, the service or API that called the particular service or API and any services or APIs called by the particular service or API.

From the perspective of a particular service, any service that calls the particular service may be referred to as a "parent service." Furthermore, from the perspective of a particular service, any service that the particular service calls may be referred to as a "child service." In a similar fashion, from the perspective of a particular request, any request from which the particular request stems may be referred to as a "parent request." Furthermore, from the perspective of a particular request, any request stemming from the particular request may be referred to as a "child request." Additionally, as used herein the phrases "request," "call," "service request" and "service call" may be used interchangeably. A request to a service may represent a request to an API of that service. Note that this terminology refers to the nature of the propagation of a particular request throughout the present system and is not intended to limit the physical configuration of the services. As may sometimes be the case with service-oriented architectures employing modularity, each service may in some embodiments be independent of other services in the service-oriented system 100 (e.g., the source code of services or their underlying components may be configured such that interdependencies among source and/or machine code are not present).

An example hierarchy of call paths in a dependency graph is illustrated in FIG. 2. In one embodiment, an initial request to an upstream service may take a route through numerous downstream services in the service-oriented system 100 in order to satisfy a particular initial request. The route may correspond to one or more call paths between services. The call paths may represent inbound service requests and outbound service requests relative to a particular service. To process a given received request, one or more services may be invoked. As used herein, an initial request may be referred to as the "root request." In various embodiments, the root request may but need not originate from a computer system outside of the service-oriented system 100. In many embodiments, a root request may be processed by an initial service such as service 110B, which may then call one or more other services such as service 110A. Additionally, each of those services may also call one or more other services, and so on until the root request is completely fulfilled.

The particular services called to fulfill a request may correspond to a call graph that includes, for each particular service of multiple services called to fulfill the same root request, the service that called the particular service and any services called by the particular service. In the example call graph of FIG. 2, the root request may be provided to a service 110B, which may then call a downstream service 110A to satisfy that root request. The service 110A may then call additional downstream services 110E, 110C, and 110D and potentially wait for responses from those services before responding to the request from the upstream service 110B. Similarly, the service 110D may call additional downstream services 110N and 110F and potentially wait for responses from those services before responding to the request from the upstream service 110A, and the service 110E may also call service 110N. Ultimately the service 110B may provide a response to the requesting entity based on a flow of responses from downstream services. For example, if the root request represents a request to view a product detail page in an online store, then the various downstream services 110A, 110E, 110C, 110D, 110N, and 110F may collaborate to build that page dynamically, and the service 110B may then provide the page to the client that issued the root request.

Instead of collecting traffic metrics specific to particular requests, individual services may aggregate traffic metrics (e.g., call volume, latency, error rate or success rate, and so on) for particular upstream call paths. For example, service 110A may keep track of the number of inbound requests originating from a particular upstream route including one or more upstream services such as service 110B. Route identifiers for upstream routes may be implemented using fixed-length hash values. When the service 110B sends an outbound request to the service 110A, then the service 110B may add to the request an outbound hash key generated based (at least in part) on its service identifier along with the inbound hash key (if any). Accordingly, as shown in FIG. 2, one or more requests 200B from service 110B as received by service 110A may represent the same upstream route 'B.' One or more requests 200BA from service 110B to service 110A as received by service 110E may represent the same upstream route 'BA.' Similarly, one or more requests 200BA from service 110B to service 110A as received by service 110C or service 110D may also represent the same upstream route 'BA.' One or more requests 200BAE from service 110B to service 110A to service 110E as received by service 110N may represent the same upstream route 'BAE.' As also shown in FIG. 2, one or more requests 200BAD from service 110B to service 110A to service 110D as received by service 110N or service 110F may represent the same upstream route 'BAD.'

Figure 3:
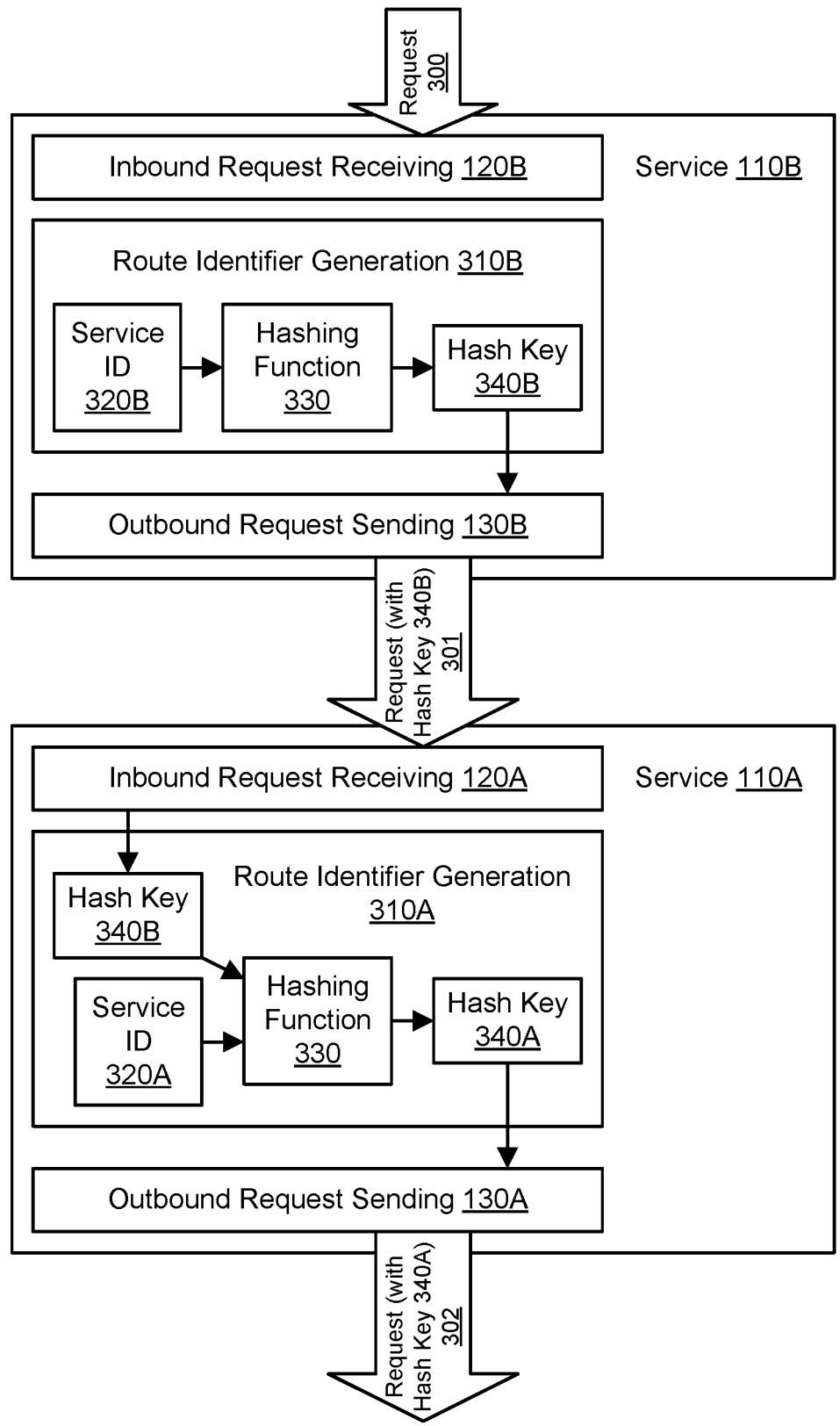
FIG. 3 illustrates further aspects of the example system environment for collecting route-based traffic metrics in a service-oriented system, including route identifier generation at services, according to some embodiments.

FIG. 3 illustrates further aspects of the example system environment for collecting route-based traffic metrics in a service-oriented system, including route identifier generation at services, according to some embodiments. As discussed above, route identifiers for upstream routes may be implemented using fixed-length hash values. Service 110B may include a component 310B for generating route identifiers. In one embodiment, a route identifier may be generated (or retrieved from memory) when the service 110B seeks to send a service request 301 to another service 110A. Using the route identifier generation 310B, service 110B may determine a service identifier 320B of the application programming interface (API) that was invoked by the request 300 and then hash that service ID using a hashing function 330 to produce a hash key 340B of a fixed length. In one embodiment, the hash key 340B may also be generated based (at least in part) on an inbound route identifier extracted from a request 300 that prompted the additional request 301. In one embodiment, if the request 300 does not include such a route ID, then the hash key 340B may be generated by hashing the service ID 320B along with a placeholder value (e.g., 00000000) representing the absent inbound route ID. In one embodiment, a service API identity hash may be generated by applying a base64md5 hash function to a service API identity string, and the outbound route ID may be generated by applying a base64md5 hash function to the inbound route ID and the service API identity hash. If the outbound call is a root request, then the outbound route ID may be the service API identity hash.

The service API identity string that is used to generate the service API identity hash may represent a concatenation or other combination of one or more attribute values that remain unchanged through service deployments, updates, and restarts. In one embodiment, the service API identity string may represent a concatenation of a resource, tenant, operation, region, and stage. The resource may be the name of a location of an instance or collection of instances that implement the service. The tenant may be a name describing the service, where multiple tenants may be located at the same resource. The operation may be the name of the API or endpoint hosted at the service whose value remains constant across requests regardless of varying request parameters or attributes. The region may represent a network region within the service-oriented system 100 or provider network. The stage may represent a deployment tier of the service, e.g., alpha, beta, gamma, or production.

The outbound request 301 from service 110B to service 110A may include the hash key 340B to enable route-based metric collection at the recipient service. Service 110A may also include a component 310A for generating route identifiers. In one embodiment, a route identifier may be generated (or retrieved from memory) when the service 110A seeks to send a service request 302 to another service. Using the route identifier generation 310A, service 110A may determine a service identifier 320A of the application programming interface (API) that was invoked by the request 300, extract the hash key 340B from the inbound request 301, and then hash those two values using the same hashing function 330 to produce a hash key 340A of the same fixed length. The outbound request 302 from service 110A may include the hash key 340A to enable route-based metric collection at the recipient service.

Figure 4:
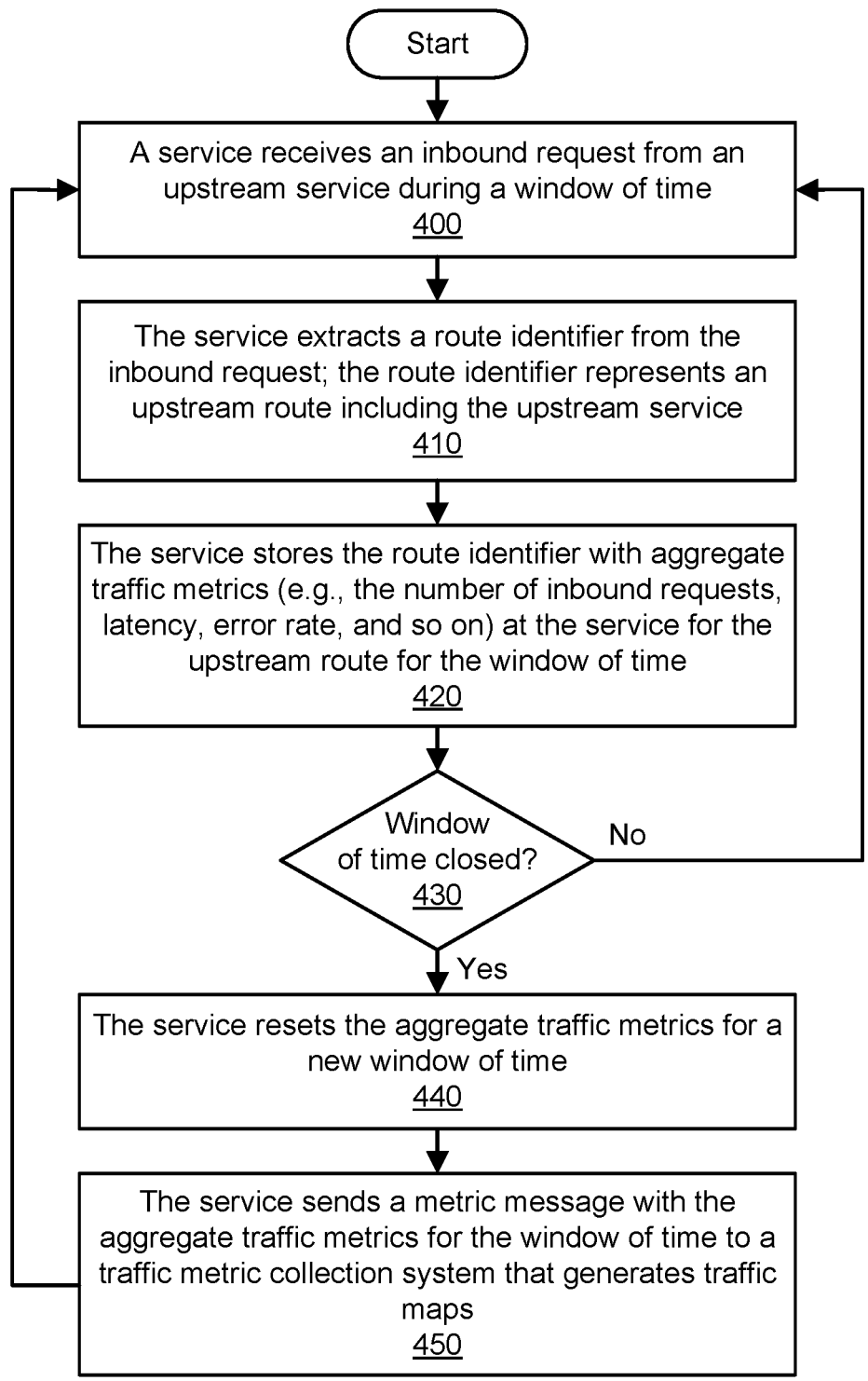
FIG. 4 is a flowchart illustrating a method for collecting route-based traffic metrics in a service-oriented system, according to some embodiments.

FIG. 4 is a flowchart illustrating a method for collecting route-based traffic metrics in a service-oriented system, according to some embodiments. As shown in 400, an API at a service may receive an inbound request from an upstream service. The inbound request may be received during a particular interval or window of time. In some embodiments, the interval may be a one-minute interval for metric collection. As shown in 410, the service may extract a route identifier from the inbound request. The route identifier may represent a "fingerprint" of an upstream route including the upstream service and optionally one or more other services in a call path. Route identifiers for upstream routes may be implemented using fixed-length hash values. In one embodiment, an agent at the service may automatically connect inbound with outbound calls by intercepting all callable and runnable methods and populating headers of outbound calls with route identifiers.

As shown in 420, the service may store the route identifier with aggregate traffic metrics at the service for the upstream route and for the current window of time. The metrics may include, for example, the number of inbound requests arriving at the service from the upstream route. In some embodiments, aggregate traffic metrics may be collected for call volume (e.g., the total number of calls to a service or API), network latency or response latency, error rate or success rate of requests, network throughput, service reliability or availability, usage metrics at service hosts (e.g., processor usage, memory usage, and so on). Sampling may not be used, and so aggregate traffic metrics may reflect all (or nearly all) requests to services for which traffic metric collection has not been disabled. Storing the route identifier with aggregate traffic metrics may include adding a newly observed route (for the current time interval) to memory resources or storage resources of the service host and/or updating traffic metrics in memory or storage for a previously observed route (for the current time interval).

As shown in 430, the service may determine whether the window of time has closed. If the window of time is still open, then the method may return to the operation shown in 400. If the interval has closed, then as shown in 440, the service may reset the aggregate traffic metrics for a new window of time. Additionally, as shown in 450, the service may send a metric message for the now-expired time interval to a traffic metric collection system. The metric message may include traffic metrics for one or more upstream routes that were observed at the service during the window of time. To reduce network congestion, the service may delay sending the metric message for a randomly determined additional time (e.g., zero seconds to fifty seconds for one-minute intervals of metric aggregation).

Using metric messages from multiple services, the traffic metric collection system may generate one or more traffic maps. Traffic map(s) may indicate call paths and/or traffic metrics in the service-oriented system. The traffic map(s) may indicate observed call paths, e.g., using dependency graphs that show a flow of requests and responses from service to service. The traffic map(s) may indicate traffic metrics such as call volume, latency, error rate or success rate, and so on for individual service hosts, fleets of service hosts for particular services, and/or sets of services. The generating of the traffic map(s) and related analysis may be performed in near-real-time after the interval of time has closed.

Figure 5:
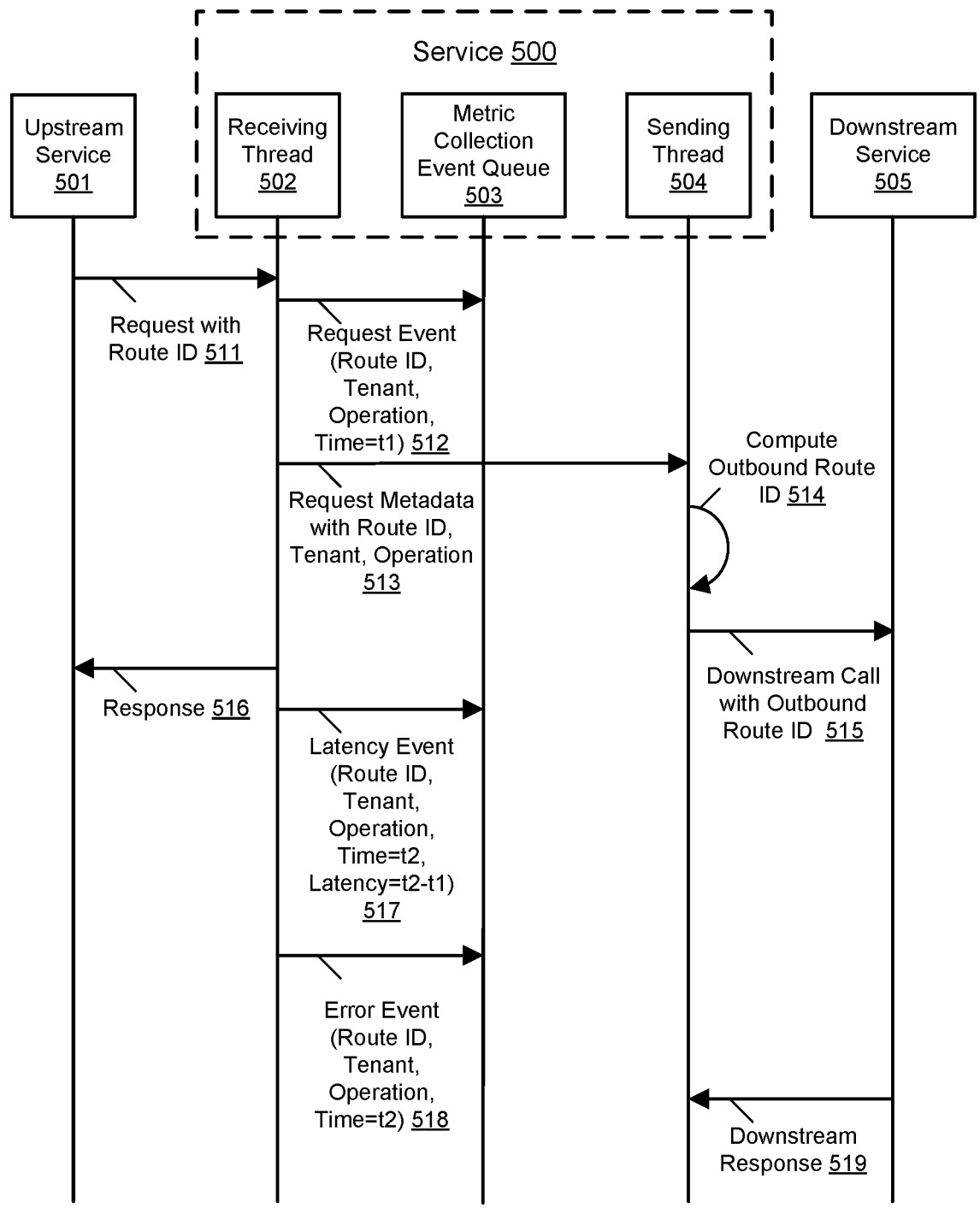
FIG. 5 illustrates further aspects of the example system environment for collecting route-based traffic metrics in a service-oriented system, including processing metric events at a service, according to some embodiments.

FIG. 5 illustrates further aspects of the example system environment for collecting route-based traffic metrics in a service-oriented system, including processing metric events at a service, according to some embodiments. A service 500 may include a receiving thread 502 for receiving inbound requests from upstream services such as service 501, a metric collection event queue, and a sending thread 504 for sending outbound requests to downstream services such as service 505. As shown by 511, the upstream service 501 may send a service request or service call including a route ID to the service 500. As shown by 512, the receiving thread 502 may add a request event or call event to the event queue 503. The event may include attributes for the route ID extracted from the inbound request, the tenant, the operation, and the current time interval (e.g., time=t1). As shown by 513, the receiving thread 502 may send request metadata with the route ID extracted from the inbound request, the tenant, and the operation to the sending thread 504. As shown by 514, the sending thread 504 may compute the outbound route ID. As shown by 515, the sending thread 504 may send a downstream call with the outbound route ID to the downstream service 505. As shown by 516, the receiving thread 502 may send a response to the upstream service 501. As shown by 517, if a latency event occurs, the sending thread 502 may add a latency event to the event queue 503. The latency event may include the route ID, tenant, operation, current interval (e.g., time=t2), and latency (e.g., t2–t1). As shown by 518, if an error occurs, the sending thread 502 may add an error event to the event queue 503. The error event may include the route ID, tenant, operation, and current interval (e.g., time=t2). As shown by 517, the downstream service 505 may provide a response to the sending thread 504.

Figure 6:
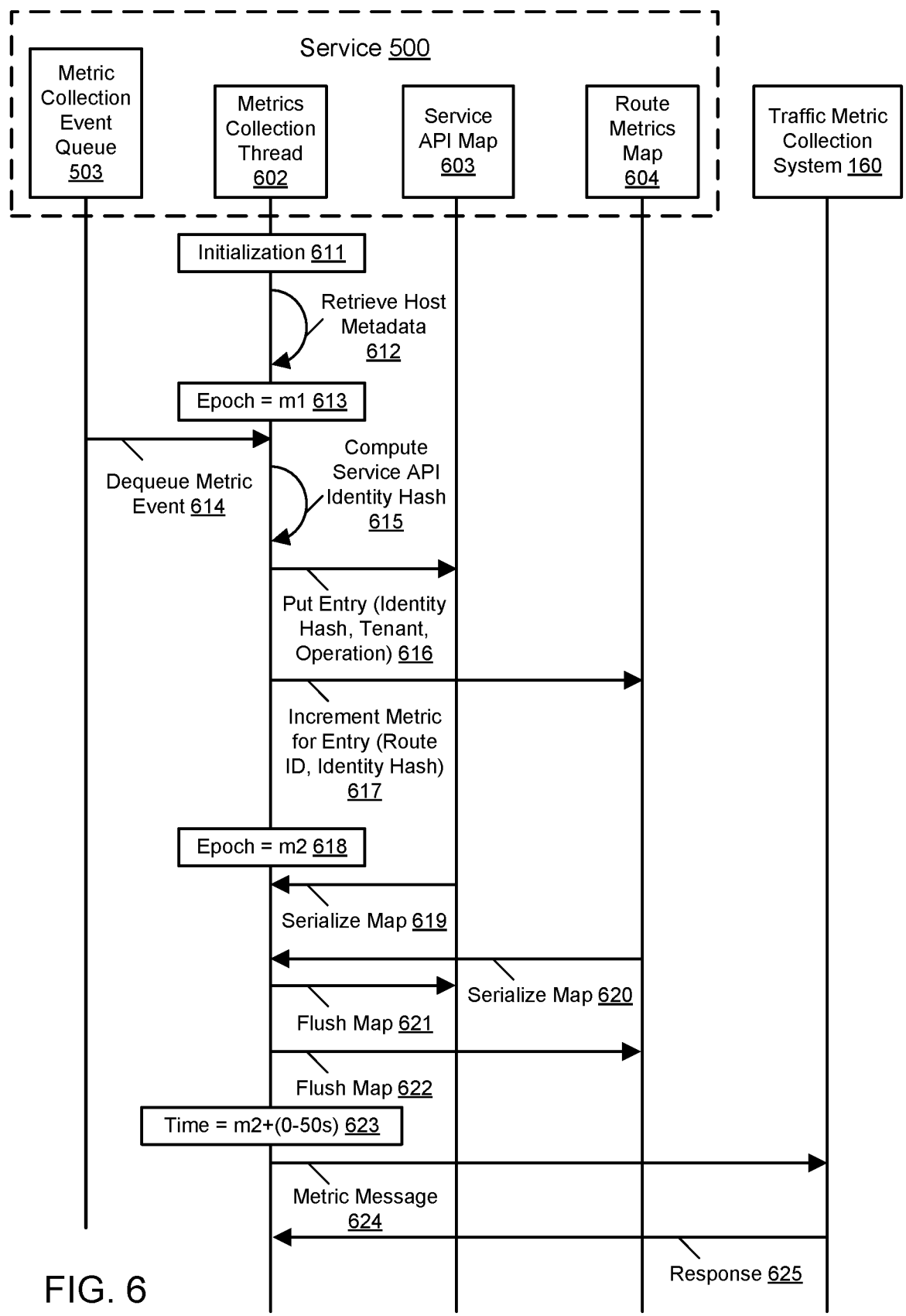
FIG. 6 illustrates further aspects of the example system environment for collecting route-based traffic metrics in a service-oriented system, including generating a metric message at a service, according to some embodiments.

FIG. 6 illustrates further aspects of the example system environment for collecting route-based traffic metrics in a service-oriented system, including generating a metric message at a service, according to some embodiments. A metrics collection thread 602 may run in the background of a service 500. The metrics collection thread 602 may poll a bounded in-memory queue 504, pause briefly when the queue is empty, and aggregate traffic events into map objects. As shown by 611, the metrics collection thread 602 may perform initialization 611, e.g., of metrics data structures. As shown by 612, the metrics collection thread 602 may retrieve host metadata. As shown by 613, a new time interval or epoch m1 may begin. As shown by 614, the metrics collection thread 602 may dequeuer a metric event from the event queue 503. As shown by 615, the metrics collection thread 602 may compute the service API identity hash. As shown by 616, the metrics collection thread 602 may put an entry including the identity hash, tenant, and operation in a service API map 603. As shown by 617, the metrics collection thread 602 may increment a metric for the entry associated with the route ID and service API identity hash in a route metrics map 604.

At the start of each minute, the metrics collection thread 602 may serialize a metric message for the previous minute and clear the map objects. As shown by 618, a new time interval or epoch m2 (the next minute) may begin. As shown by 619, the metrics collection thread 602 may serialize the service API map 603. As shown by 620, the metrics collection thread 602 may serialize the route metrics map 604. As shown by 621, the metrics collection thread 602 may flush the service API map 603. As shown by 622, the metrics collection thread 602 may flush the route metrics map 604. Each host may be assigned a random number of 0-50 seconds to delay sending its metric message. As shown by 623, time m2+the random number of seconds may arrive. As shown by 624, the metrics collection thread 602 may send a metric message with the serialized service API map and serialized route metrics map to the traffic metric collection system 160. As shown by 625, the traffic metric collection system 160 may send a response to the metric message that acknowledges successful receipt.

Figure 7A:
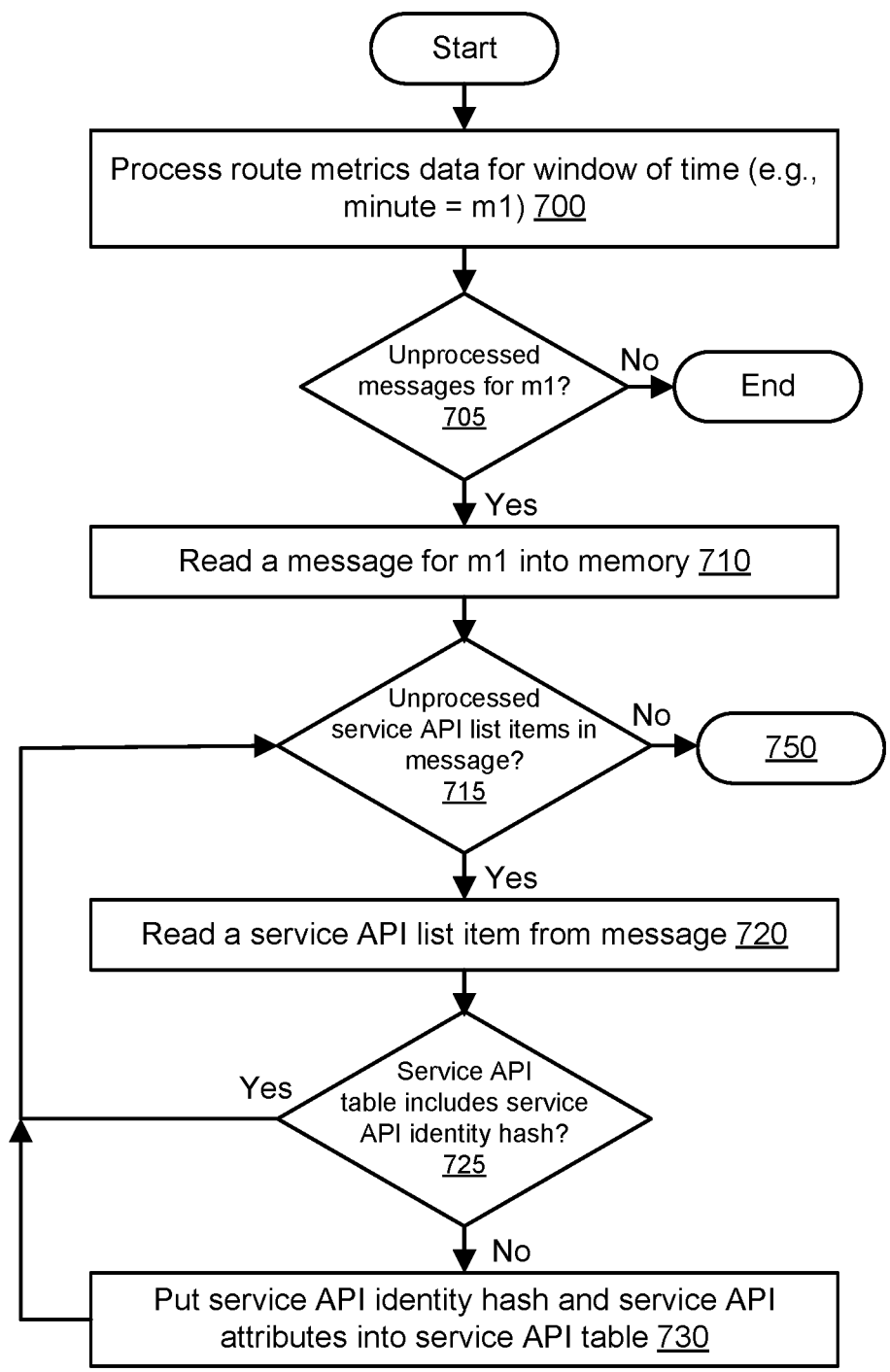
FIGS. 7A and 7B are flowcharts illustrating further aspects of the method for collecting route-based traffic metrics in a service-oriented system, including processing metric messages at a traffic metric collection system, according to some embodiments.
Figure 7B:
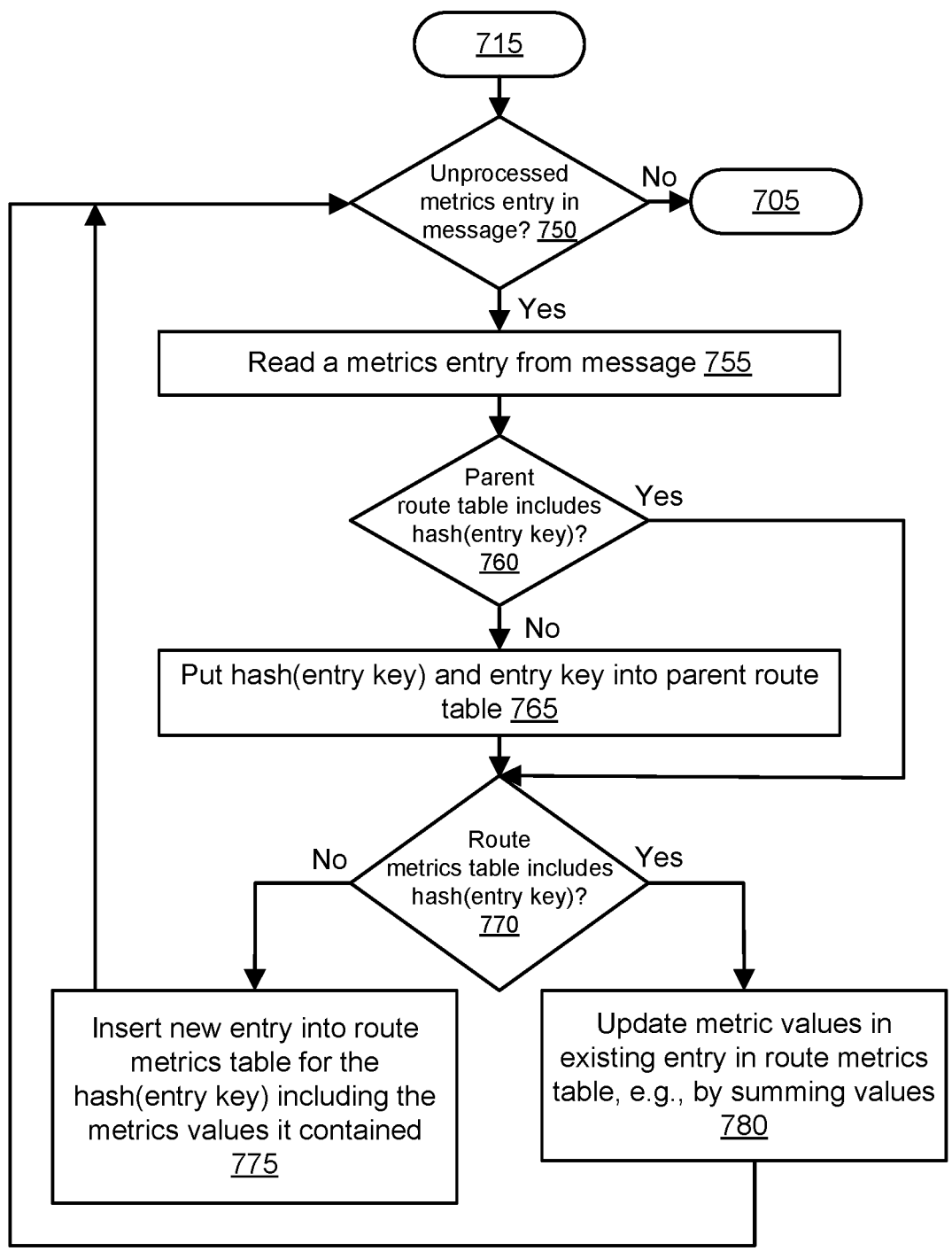

FIGS. 7A and 7B are flowcharts illustrating further aspects of the method for collecting route-based traffic metrics in a service-oriented system, including processing metric messages at a traffic metric collection system, according to some embodiments. The traffic metric collection system 160 may receive metric messages 155 from various service hosts. Metric messages may be persisted in batches using a storage service to insulate the client-facing service from subsequent processing steps. Batches may be determined by file size and/or elapsed time. Metric messages or batch files may be processed, e.g., to derive dependency graphs, traffic distribution maps, and/or other reports. The operations shown in FIG. 7A and FIG. 7B may be performed across a cluster of nodes. The cluster may be scaled proportionately to the number of hosts in the service-oriented system 100.

As shown in 700, route metrics data may be processed for a window or interval of time (e.g., minute=m1). To process metric messages for one or more time intervals (epoch minutes), the traffic metric collection system 160 may deserialize a message and add each item in its service API list to a hash table of service APIs, where the key is the service API identity hash and the value is an object containing the service API attributes. As shown in 705, the method may determine whether there are any unprocessed messages for the minute m1. If not, then the method may end. If so, then as shown in 710, the method may read a message for m1 into memory. As shown in 715, the method may determine whether there are any unprocessed service API list items in the message. If not, then the method may proceed to the operation shown in 750. If so, then as shown in 720, the method may read a service API list item from the message. As shown in 725, the method may determine whether the service API table includes the service API identity hash. If not, then as shown in 730, the method may put the service API identity hash and the service API attributes into the service API table. The method may proceed again with the operation shown in 715.

As shown in 750, the method may determine whether there are any unprocessed metrics entries in the message. If so, then method may return to the operation shown in 705. As shown in 755, the method may read a metrics entry from the message. As shown in 760, the method may determine whether the parent route table includes a hash of the entry key. If not, then as shown in 765, the method may put the hash of the entry key (along with the entry key itself) into the parent route table. The traffic metric collection system 160 may compute the route ID hash of each key in its route metrics object and add the hash to a hash table of parent routes in which the value is an object containing the route ID and the service API identity hash from the key. As shown in 770, the method may determine whether the route metrics table includes a hash of the entry key. If not, then as shown in 775, the method may insert a new entry into the route metrics table for the hash of the entry key, where the new entry includes the corresponding metric values. If so, then as shown in 780, the method may update metric values in the existing entry in the route metrics table, e.g., by summing values. The traffic metric collection system 160 may merge the route metrics object entries into a hash table. The table keys may be objects containing the route ID, service API identity hash, and epoch minute. The table values may include objects containing the aggregate metrics.

After all messages have been read, the traffic metric collection system 160 may optionally validate entries in the parent route table. Valid routes may be limited to a maximum call depth. Validation may include inverting the entries of the parent route table into a table of child routes, filtering the child route table repeatedly to collect route IDs within the allowed depth, and filtering the parent route table using the valid route IDs. Dependency metrics may be derived from the parent route table, service API table, and route metrics tables by aggregating the metrics across the routes along which one service API may have directly or indirectly called another. For each entry in the route metrics table, the traffic metric collection system 160 may list its upstream service API identity hash by recursively looking up the parent route starting with the entry key. For each entry in the route metrics table, the traffic metric collection system 160 may then merge the entry value into the dependency metrics hash table entry for each pair of service APIs. For each entry in the route metrics table, the traffic metric collection system 160 may then look up the service API attributes corresponding to the service API identity hashes of the entry key and the list.

A service dependency graph may represent the set of service API pairs that have direct interaction along routes observed to transit some service API during the time interval. Service dependency graphs may be derived in bulk from the parent route and service API tables by taking unions of routes. Similar steps may be used to compute dependency graphs for other aggregations. In one embodiment, a complete service dependency graph may be built by collecting all service API pairs that have direct interaction along any route observed during a time interval. The traffic metric collection system 160 may filter the parent route table for "leaf route" entries whose keys are not the route ID of any other entry. For each leaf route entry, the traffic metric collection system 160 may list the service API pairs that directly interact by recursively looking up the parent route starting with the entry key. For each leaf route entry and for each distinct service API in the list, the traffic metric collection system 160 may add the list items to a hash table in which the key is a service API identity hash and the value is a set of service API pairs. The traffic metric collection system 160 may compute traffic distribution maps that extend dependency metrics to include the derived call ratio. The derived call ratio may represent the number of calls to a downstream service API that arose as a result of a single call to the upstream service API within that time interval.

Illustrative Computer System

Figure 8:
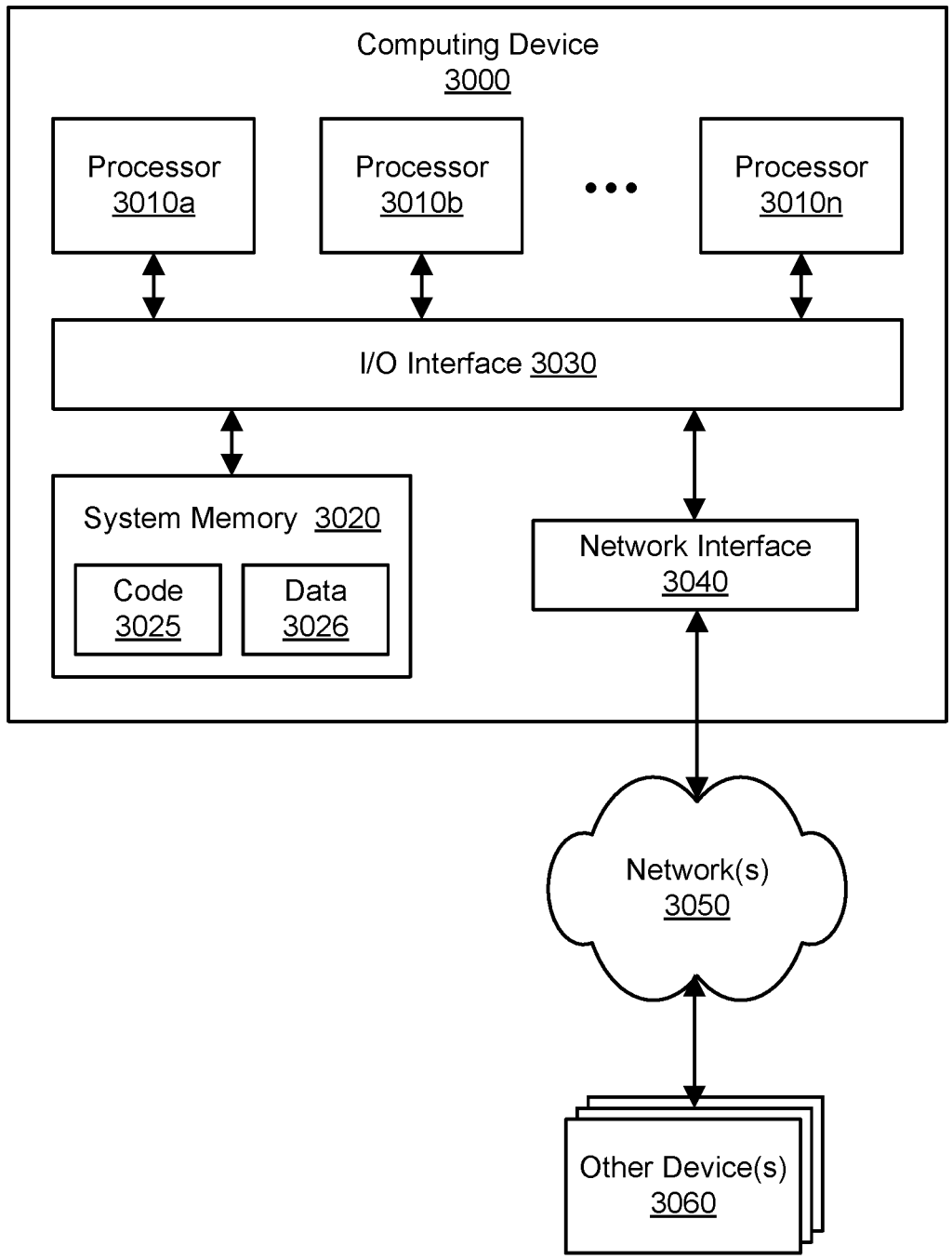
FIG. 8 illustrates an example of a computing device that may be used in some embodiments.

In at least some embodiments, a computer system that implements a portion or all of one or more of the technologies described herein may include a general-purpose computer system that includes or is configured to access one or more computer-readable media. FIG. 8 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of at least one computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. When used in the claims, the term "or" is used as an inclusive or and not as an exclusive or. For example, the phrase "at least one of x, y, or z" means any one of x, y, and z, as well as any combination thereof.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    a plurality of computing devices configured to implement a service-oriented system, wherein the service-oriented system comprises a plurality of services including a first service and a second service, and wherein the first service is configured to:
        receive an inbound request from the second service to the first service;
        extract, from the inbound request, a hash key representing an upstream route including the second service and one or more upstream services of the plurality of services;
        store the hash key and a counter representing a number of inbound requests with the hash key that have been received by the first service over a current window of time; and
        send, to a traffic metric collection system, a metric message comprising the hash key and the counter, wherein the metric message represents an aggregation associated with the current window of time, and wherein the counter indicates that a plurality of inbound requests were received by the first service from the upstream route over the current window of time; and
    one or more computing devices configured to implement the traffic metric collection system, wherein the traffic metric collection system is configured to:
        receive the metric message from the first service;
        receive one or more additional metric messages from one or more additional services of the plurality of services; and
        determine one or more traffic maps in the service-oriented system, wherein the one or more traffic maps are determined based at least in part on the metric message from the first service and the one or more additional metric messages from one or more additional services, and wherein the one or more traffic maps indicate one or more flows of requests through the first service, the second service, and the one or more additional services.

2. The system as recited in claim 1, wherein the first service is further configured to:
    generate an outbound hash key based at least in part on the hash key and a service identifier of the first service, wherein the outbound hash key has a same length as the hash key; and
    send an outbound request to a downstream service of the plurality of services, wherein the outbound request comprises the outbound hash key.

3. The system as recited in claim 1, wherein the metric message indicates a call volume, a response latency, and a success rate at the first service over the current window of time.

4. The system as recited in claim 1, wherein the one or more traffic maps indicate call volumes, response latency, and success rates at individual ones of the plurality of services.

5. A method, comprising:
- receiving, by a first service in a service-oriented system comprising a plurality of services, an inbound request from a second service in the service-oriented system;
- extracting, by the first service from the inbound request, a route identifier representing an upstream route including the second service;
- storing, by the first service, the route identifier and a counter representing a number of inbound requests with the route identifier that have been received by the first service over a current window of time; and
- sending, by the first service to a traffic metric collection system, a metric message comprising the route identifier and the counter, wherein traffic metric data is determined by the traffic metric collection system based at least in part on the metric message from the first service and one or more additional metric messages from one or more additional services of the plurality of services, and wherein the traffic metric data indicates one or more flows of requests through the plurality of services.

6. The method as recited in claim 5, further comprising:
- generating, by the first service, an outbound route identifier based at least in part on the route identifier and a service identifier of the first service; and
- sending, by the first service, an outbound request to a downstream service of the plurality of services, wherein the outbound request comprises the outbound route identifier.

7. The method as recited in claim 6, wherein the route identifier represents a first hash value, wherein the outbound route identifier represents a second hash value, and wherein the second hash value has a same length as the first hash value.

8. The method as recited in claim 5, wherein the traffic metric data indicates call volumes, response latency, and error rates at individual ones of the plurality of services.

9. The method as recited in claim 5, further comprising:
- identifying one or more traffic anomalies in the service-oriented system based at least in part on the traffic metric data.

10. The method as recited in claim 5, further comprising:
- determining a resource usage for a root request in the service-oriented system based at least in part on the traffic metric data, wherein the upstream route comprises an additional service that sent the root request.

11. The method as recited in claim 5, further comprising:
- resetting the counter after the current window of time;
- receiving, by the first service, an additional inbound request from the second service during a newer window of time;
- extracting, by the first service from the inbound request, the route identifier representing the upstream route including the second service;
- storing, by the first service, the route identifier and a new counter representing a number of inbound requests with the route identifier that have been received by the first service over the newer window of time; and
- sending, by the first service to the traffic metric collection system, a newer metric message comprising the route identifier and the newer counter.

12. The method as recited in claim 5, further comprising:
- receiving, by the first service, an additional inbound request from a third service in the service-oriented system;
- extracting, by the first service from the additional inbound request, an additional route identifier representing an additional upstream route including the third service and one or more upstream services of the plurality of services;
- storing, by the first service, the additional route identifier and an additional counter representing a number of inbound requests with the additional route identifier that have been received by the first service over the current window of time; and
- sending, by the first service to the traffic metric collection system, the metric message comprising the additional route identifier and the additional counter, wherein the traffic metric data indicates one or more flows of requests through the first service, the second service, the third service, and the one or more upstream services.

13. One or more non-transitory computer-readable storage media storing program instructions that, when executed on or across one or more processors, perform:
- receiving, by a first service in a service-oriented system comprising a plurality of services, an inbound request to an application programming interface (API) of the first service from a second service in the service-oriented system;
- extracting, by the first service from the inbound request, a hash key representing an upstream route including the second service;
- storing, by the first service, the hash key and a counter representing a number of inbound requests with the hash key that have been received by the first service over a current window of time; and
- sending, by the first service to a traffic metric collection system, a metric message comprising the hash key and the counter, wherein the metric message is associated with the current window of time, wherein the counter indicates that a plurality of inbound requests were received by the first service from the upstream route over the current window of time, wherein one or more traffic maps are determined by the traffic metric collection system based at least in part on the metric message from the first service and one or more additional metric messages from one or more additional services of the plurality of services, and wherein the one or more traffic maps indicate one or more flows of requests through the plurality of services.

14. The one or more non-transitory computer-readable storage media as recited in claim 13, further comprising additional program instructions that, when executed on or across the one or more processors, perform:
- generating, by the first service, an outbound hash key based at least in part on the hash key and a service identifier of the first service; and
- sending, by the first service, an outbound request to a downstream service of the plurality of services, wherein the outbound request comprises the outbound hash key.

15. The one or more non-transitory computer-readable storage media as recited in claim 14, wherein the outbound hash key has a same length as the hash key.

16. The one or more non-transitory computer-readable storage media as recited in claim 13, wherein the metric message indicates a call volume, a response latency, and a success rate at the first service over the current window of time.

17. The one or more non-transitory computer-readable storage media as recited in claim 13, further comprising additional program instructions that, when executed on or across the one or more processors, perform:

performing demand forecasting in the service-oriented system based at least in part on the one or more traffic maps.

18. The one or more non-transitory computer-readable storage media as recited in claim 17, further comprising additional program instructions that, when executed on or across the one or more processors, perform:

auto-scaling individual ones of the services in the service-oriented system based at least in part on the demand forecasting.

19. The one or more non-transitory computer-readable storage media as recited in claim 13, further comprising additional program instructions that, when executed on or across the one or more processors, perform:

resetting the counter after the current window of time;

receiving, by the first service, an additional inbound request from the second service during a newer window of time;

extracting, by the first service from the inbound request, the hash key representing the upstream route including the second service;

storing, by the first service, the hash key and a new counter representing a number of inbound requests with the hash key that have been received by the first service over the newer window of time; and sending, by the first service to the traffic metric collection system, a newer metric message comprising the hash key and the newer counter.

20. The one or more non-transitory computer-readable storage media as recited in claim 13, further comprising additional program instructions that, when executed on or across the one or more processors, perform:

receiving, by the first service, an additional inbound request from a third service in the service-oriented system;

extracting, by the first service from the additional inbound request, an additional hash key representing an additional upstream route including the third service and one or more upstream services of the plurality of services;

storing, by the first service, the additional hash key and an additional counter representing a number of inbound requests with the additional hash key that have been received by the first service over the current window of time; and sending, by the first service to the traffic metric collection system, the metric message comprising the additional hash key and the additional counter, wherein the one or more traffic maps indicate one or more flows of requests through the first service, the second service, the third service, and the one or more upstream services.

* * * * *